S. STEWART.
Manufacture of Fly-Net for Horses.
No. 210,819. Patented Dec. 10, 1878.
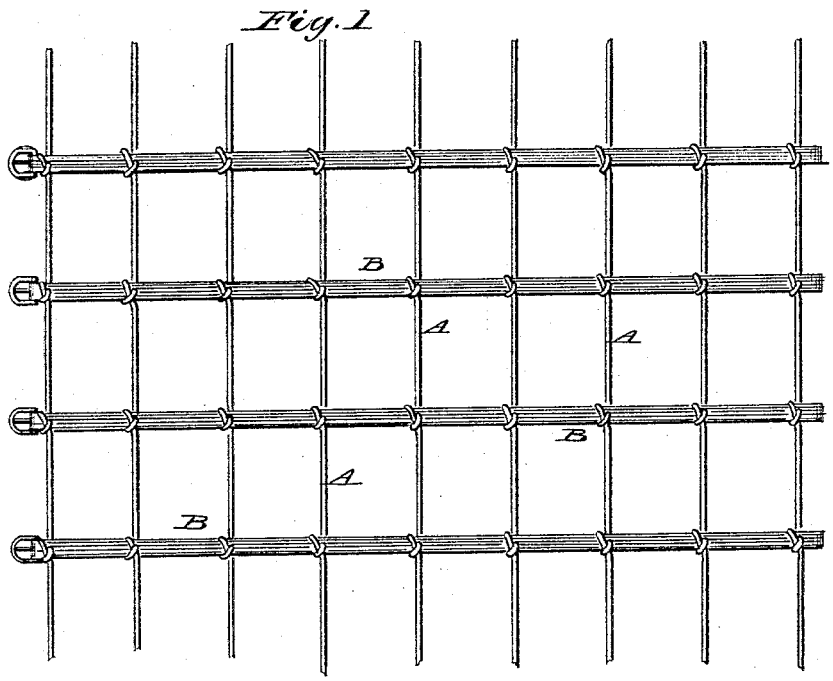
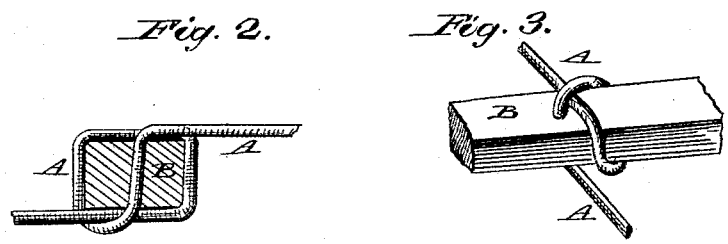
Witnesses
Fred. G. Dieterich
George Binkenburg
Inventor.
Samuel Stewart
by Louis Bagger & Co.
his attorneys

UNITED STATES PATENT OFFICE.

SAMUEL STEWART, OF LANDISBURG, PENNSYLVANIA.

IMPROVEMENT IN MANUFACTURE OF FLY-NETS FOR HORSES.

Specification forming part of Letters Patent No. 210,819, dated December 10, 1878; application filed October 14, 1878.

*To all whom it may concern:*

Be it known that I, SAMUEL STEWART, of Landisburg, in the county of Perry and State of Pennsylvania, have invented certain new and useful Improvements in Fly-Nets for Horses, &c.; and I do hereby declare that the following is a full, clear, and exact description thereof, which will enable others skilled in the art to which it appertains to make and use the same, reference being had to the accompanying drawings, which form part of this specification, and in which—

Figure 1 is a plan view of my improved fly-net for horses or other animals. Fig. 2 is a transverse section of the same, and Fig. 3 is a detailed perspective view thereof.

Corresponding parts in the several figures are denoted by like letters.

This invention relates to certain improvements in fly-nets for horses or other animals; and it consists in the particular manner of securing the cross-strands or webbing to the longitudinal pieces or straps of the net, substantially as hereinafter more fully set forth.

In the drawing, A A refer to the cross-pieces or webbing of the net, made in the usual way, and are secured to the longitudinal pieces or straps B of the net, as hereinafter or presently described.

Through the longitudinal pieces B B are made holes, extending through the same horizontally, and at short and equal distances apart. The webbing-pieces A A are first passed around and under the pieces B B, thence back over the same, thus looping the extending portions, and thence passed through the holes in said pieces B B, by which they are firmly secured to the latter, the perforated parts of the pieces B strengthened, and the latter prevented from being displaced or moving laterally.

The net is provided with suitable means for its adjustment or attachment to the harness on the animal.

Having described the construction of my invention, it will be seen that it is exceedingly simple, cheap, and easily made, as well as strong and durable.

Having thus fully set forth my invention, I claim and desire to secure by Letters Patent of the United States—

The improved method or process of forming fly-nets for horses or other animals, consisting of securing the transverse strips or pieces to the longitudinal strips by passing the transverse strip or piece underneath and then back over the longitudinal strip, thus forming a loop, then passing the free end of the transverse strip or piece through the longitudinal strip and drawing it closely around the latter, all as shown and described.

In testimony that I claim the foregoing as my own I have hereto affixed my signature in the presence of two witnesses.

SAMUEL STEWART.

Witnesses:
   ALBERT M. WINGERT,
   JOHN F. WINGERT.